United States Patent
Nayyar et al.

(10) Patent No.: US 11,121,932 B2
(45) Date of Patent: Sep. 14, 2021

(54) METHOD AND APPARATUS FOR MODEL MAPPING AND DYNAMICALLY ENABLING EXTERNAL MODEL ON THE NETWORK DEVICE

(71) Applicant: Cisco Technology, Inc., San Jose, CA (US)

(72) Inventors: Munish Nayyar, Fremont, CA (US); Shyam Naren Kandala, Mountain View, CA (US); Harjinder Singh, Fremont, CA (US); Rajan Narayanan, San Jose, CA (US); Einar Nilsen-Nygaard, Waterside (GB)

(73) Assignee: Cisco Technology, Inc., San Jose, CA (US)

( * ) Notice: Subject to any disclaimer, the term of this patent is extended or adjusted under 35 U.S.C. 154(b) by 239 days.

(21) Appl. No.: 16/380,009

(22) Filed: Apr. 10, 2019

(65) Prior Publication Data
US 2020/0328948 A1    Oct. 15, 2020

(51) Int. Cl.
| | |
|---|---|
| *G06F 15/177* | (2006.01) |
| *H04L 12/24* | (2006.01) |
| *G06F 16/21* | (2019.01) |
| *G06F 8/60* | (2018.01) |
| *G06F 9/455* | (2018.01) |

(52) U.S. Cl.
CPC ............ *H04L 41/145* (2013.01); *G06F 8/60* (2013.01); *G06F 16/212* (2019.01); *H04L 41/0803* (2013.01); *G06F 9/455* (2013.01)

(58) Field of Classification Search
CPC .. H04L 41/145; H04L 41/0803; G06F 16/212
USPC .......................................... 709/222–223, 203
See application file for complete search history.

(56) References Cited

U.S. PATENT DOCUMENTS

| | | | |
|---|---|---|---|
| 8,849,987 B2 | 9/2014 | Berg et al. | |
| 9,501,263 B2 | 11/2016 | Pana et al. | |
| 9,715,380 B2 | 6/2017 | Ramachandran et al. | |
| 10,230,585 B1* | 3/2019 | A .......................... | H04L 41/022 |
| 10,852,995 B2* | 12/2020 | Sterin ................... | G06F 3/0608 |
| 2016/0350095 A1* | 12/2016 | Ramachandran ... | H04L 41/0213 |
| 2017/0289060 A1* | 10/2017 | Aftab .................. | H04L 41/5054 |
| 2018/0013662 A1 | 1/2018 | Salam et al. | |
| 2018/0102934 A1 | 4/2018 | Ly et al. | |

OTHER PUBLICATIONS

International Search Report and Written Opinion from the International Searching Authority, dated Jul. 14, 2020, 14 pages, for corresponding International Patent Application No. PCT/US2020/027097.
Shafer, P., "An Architecture for Network Management Using NETCONF and YANG," Internet Engineering Task Force (IETF), Jun. 11, pp. 1-30.

* cited by examiner

*Primary Examiner* — Duyen M Doan
(74) *Attorney, Agent, or Firm* — Polsinelli

(57) ABSTRACT

A data model can be customized by a user and executed in real-time at a network device. The user provides definitions for the customized data model based on a data model locally stored on the network device. The user provided definitions are used to generate a mapping contract which is processed by a mapping package generator to generate a mapping package. The mapping package can then be processed by a translation engine to dynamically execute a customized data model in real-time.

20 Claims, 7 Drawing Sheets

METHOD AND APPARATUS FOR MODEL MAPPING AND DYNAMICALLY ENABLING EXTERNAL MODEL ON THE NETWORK DEVICE

FIELD

The present invention generally relates to network management. In particular, the present invention relates to deploying a data model to network resources.

BACKGROUND

It is often the case that a user of a network management service needs to deploy a customized data model to a hosted service. Successfully deploying a data model typically requires binding functionality directly to a target device. As a result, operationalizing custom data models for a hosted service is often performed via a manual process of collaboration between the user and technicians or other specialists for the hosted service.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompany drawings in which.

DESCRIPTION OF EXAMPLE EMBODIMENTS

Figure 1:
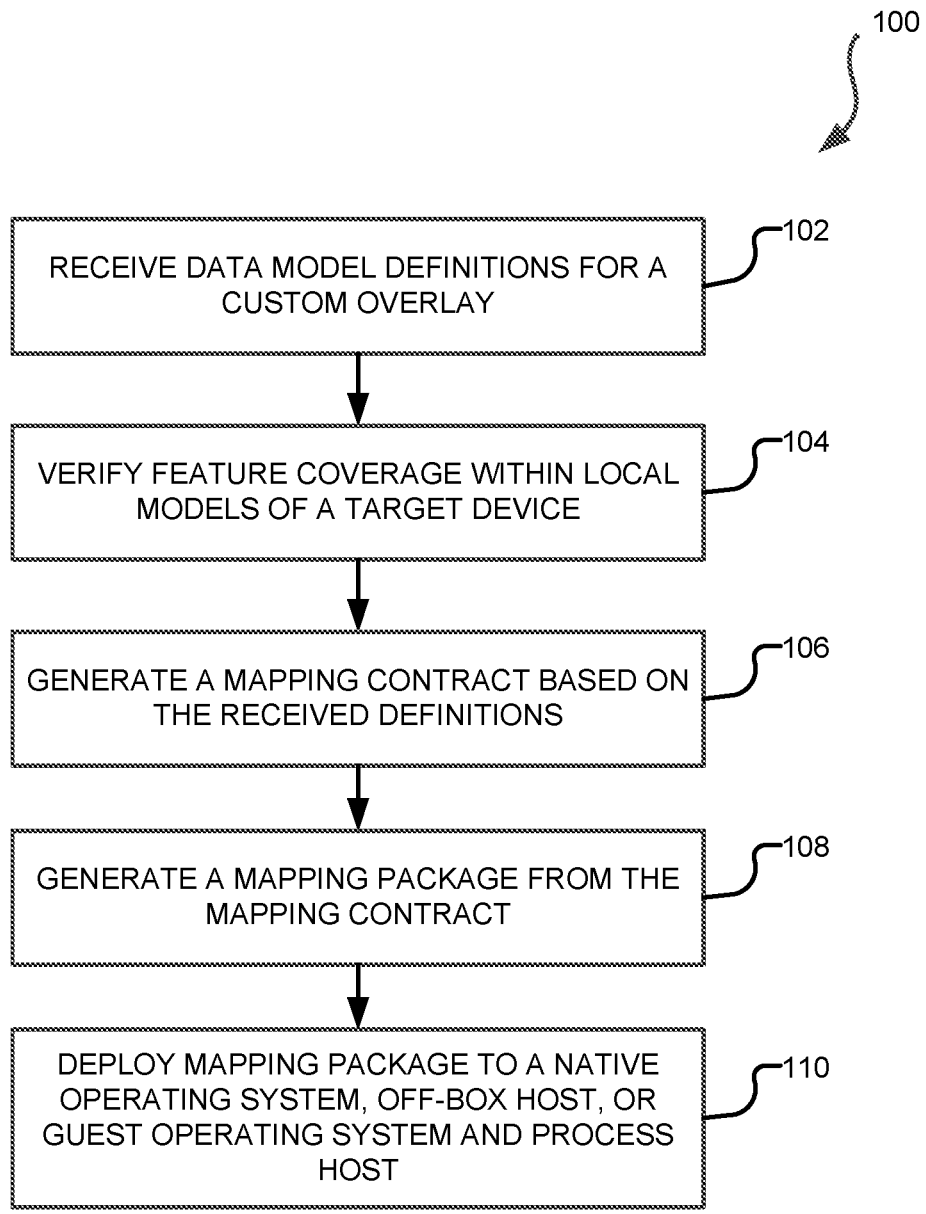
FIG. 1 illustrates a flowchart of an example method for deploying a customized data model, according to various embodiments of the subject technology.

Various embodiments of the disclosure are discussed in detail below. While specific representations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain cases, well-known or conventional details are not described in order to avoid obscuring the description. References to one or more embodiments in the present disclosure can be references to the same embodiment or any embodiment; and, such references mean at least one of the embodiments.

References to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatuses, methods, and their related results according to the embodiments of the present disclosure are given below. Note that titles or subtitles may be used in the examples for convenience of a read, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure can be realized and obtained by means of the instruments and combinations particularly pointed out in the appended claims. These and other features of the disclosure will be become fully apparent from the following description and appended claims, or can be learned by the practice of the principles set forth herein.

Overview

Network device (e.g., routers, switches, etc.) capabilities can be extended dynamically by providing externally customized models to a model mapping process. In particular, data models (e.g., YANG, etc.) can be customized at a user device and provided to a network device (e.g., via a network management service, etc.). The customized data models may then be used to extend and/or augment existing data models stored on the network device to provide the functionality of the customized model. In addition, downstream devices and/or respective data models may be likewise extended to seamlessly deploy customized data models to network devices across a managed network.

In one example, a user provides definitions related to one or more changes in functionality of a data model for a network device. A mapping package including one or more mappings for the data model is generated based on the received definitions. A mapping translation engine deploys the mapping package to the network device and the network device operates according to the deployed mapping package (e.g., via controller configurations, etc.).

Example Embodiments

In some examples, a user can define elements of a data model based on particular user needs and the like. Generally, the data model may be formatted as a tree data structure, such as in YANG data models and the like. For example, various elements of the data model may be nested within, or be child elements of, other elements of the data model. As a result, the data model can be interpreted (by a computer, compiler, interpreter, etc.) as a tree structure with parent nodes and child nodes (which may themselves be parent nodes to additional child nodes), etc.

The user defined data model may then be provided to a translation and mapping process hosted on either a target network device or as an interim or middle-layer service between the user client and the target network device. The customized data model may be mapped to one or more network device models. In effect, relationships between network device data models and the customized data model may be identified in relation to particular features to generate a mapping.

In some examples, information related to the mapping, sometimes referred to as mapping knowledge, can be expressed as annotations (e.g., YANG, etc.). The annotations may serve as a mapping contract which informs interacting data types, formats, and functions of what to expect between each other. In particular, the mapping contract may inform an interpreter at runtime how to parse and process received data. In some examples, the mapping contract is received by code generators for configuring and loading dynamically linked libraries ("DLLs") to a network device identified by, for example, a device model registry.

As a result, user defined data models may extend stored models already accessible by the network device. Additionally, entirely new data models may be deployed to the network device as an overlay atop existing data models. A workflow for deploying customized data models to a network device may be as follows.

A user defines a customized data model as an overlay data model over a native (to the network device) or standard data model. In addition, the user may instead define the customized data model as an extension to a supported native or standard data model.

The customized data model is checked against the network device for feature support. In particular, hardware functionality and relevant local data model support are checked against the customized data model to ensure successful deployment. In some examples, where hardware functionality is not sufficient for deployment of the customized data model, the user may be prompted to remedy the issue. Likewise, if a mismatch is detected between the customized data model and a local data model, the user may be prompted to remedy the mismatch by updating the local model reference (e.g., mismatches of data model versions, types, etc.).

If the customized data model is compatible with the network device hardware and/or local data models, a mapping contract can be generated. The mapping contract may be automatically generated or may use user provided mapping definitions. In some examples, the generated mapping contract may be shared to a community repository or ecosystem for sharing feedback, optimizations, and/or implementation information.

The mapping contract can then be processed by a package generator to generate a mapping package. The mapping package may be of various file types and formats, such as ".mpkg" and the like. The package generator includes various pluggable mapping functions in various programming languages, such as C or Python, and may determine appropriate pluggable mapping functions based on, for example and without imputing limitation, included libraries in respective data models and the like.

The mapping package (e.g., a .mpkg file) may then be deployed to the network device. In some examples, a native operating system (OS) may host the deployed mapping package. In some examples, such as in "off-box" hosting, a separate device operating as a controller hosts the deployed mapping package. Further, in some examples, a guest OS and/or hosted process hosts the deployed mapping package to provide dynamic extension of the data model. Once hosted, the deployed mapping package (and by extension customized data models) can, for example, perform routing and network traffic management for a configured device such as a switch, router, etc.

FIG. 1 depicts a method 100 for deploying a data model to a network device. In particular, the network device such as a switch or the like may receive a data model, for example and without imputing limitation, to manage network traffic within a network.

At step 102, data model definitions are received for a custom overlay. The custom overlay may be a customized data model that can overlay on a locally stored data model of the network device. For example, the network device may support a selection of native or open standard data models and a data model overlay may be used to enhance one or more of the native or open standard data models. Enhancements may include custom traffic management, security rules, business logic rules, and the like.

At step 104, feature coverage for the network device of the local model(s) referenced by the received overlay are verified. For example, hardware specifications, protocols, etc. referenced by an overlay may be verified as matching the network device feature set to avoid returning errors at deployment of the data model to the network device. In some examples, where feature verification fails, a user may be prompted to update the model definitions to correct the failure.

At step 106, a mapping contract is generated based on the received definitions. In some examples, the mapping contract is an annotated or marked up data structure such as an annotated YANG document or the like. The generated mapping contract identifies data sources, destinations, and treatment and may be associated with a single namespace. As a result, related data models (e.g., inheriting or otherwise incorporating the same namespace) may incorporate some or all of the data model overlay.

At step 108, a mapping package is generated from the mapping contract. The mapping package may be a machine executable version of the mapping contract. For example, the mapping package may include referenced libraries, in whole or in part, linkages, and be formatted in a non-human readable structure. The mapping package can be compiled and/or interpreted by an appropriately configured program or process.

At step 110, the mapping package is deployed to a native operating system, an off-box host, or a guest operating system and process host. In the case of a native operating system, the mapping package is deployed to the network device and the network device directly executes the data model of the mapping package. In the cases of an off-box host or guest operating system and process host, the mapping package may be deployed in whole or in part to an additional environment (either physical or virtual) associated with the network device. For example, the network device may host a guest operating system, such as a lightweight linux distribution, etc., for hosting a runtime translator to perform real-time mapping translations as needed or initiate side processes according to the custom data model overlay.

Figure 2:
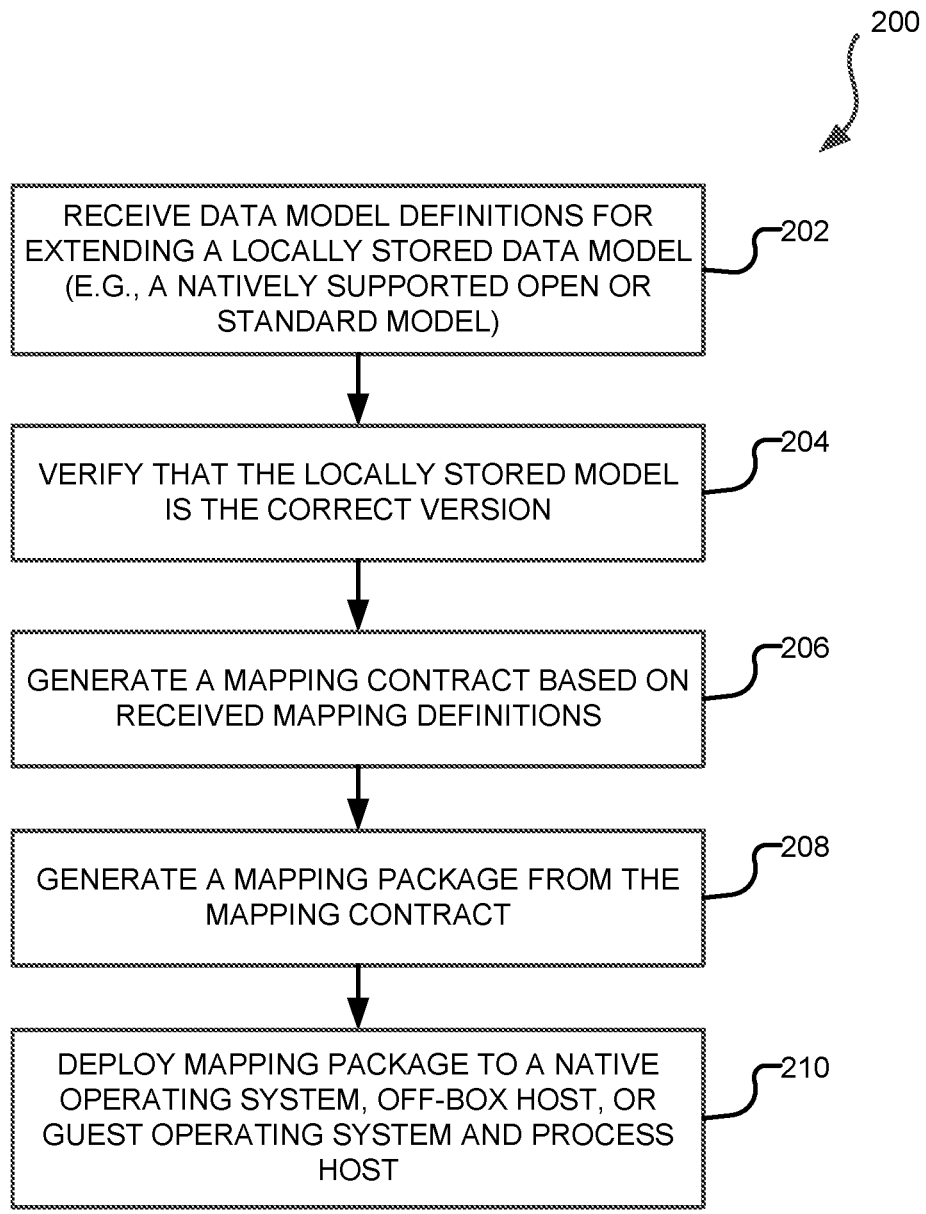
FIG. 2 illustrates a flowchart of an example method for deploying a customized data model, according to various embodiments of the subject technology.

FIG. 2 depicts a method 200 for deploying an extension of a data model to a network device. Instead of, or in addition to, a data model overlay, existing data models may be extended to include additional features not otherwise available to a user, or available to an otherwise insufficient degree.

At step 202, data model definitions for extending a locally stored data model are received. The locally stored data model can be a natively supported open data model or standard data model. Extending a data model may include, for example, adding new features, functions, data types, and the like to an existing data model. In some examples, the data model to be extended may be stored in a repository and associated with the user. As a result, a user may have a number of user-specific extended data models which can be accessed as needed.

At step 204, versioning and presence of the locally stored data model are verified. For example, where data model definitions reference a particular native data model version, a respective data model repository (e.g., database, local memory, etc.) may be checked to ensure the referenced data model version is available either generally or to the user in particular.

Steps 206-210 may then proceed in substantially similar form to steps 106-110 discussed above. At step 206, a mapping contract is generated based on the received definitions. At step 208, a mapping package is generated based on the mapping contract. At step 210, the mapping package is deployed to a native operating system, off-box host, or guest operating system and process host.

Figure 3:
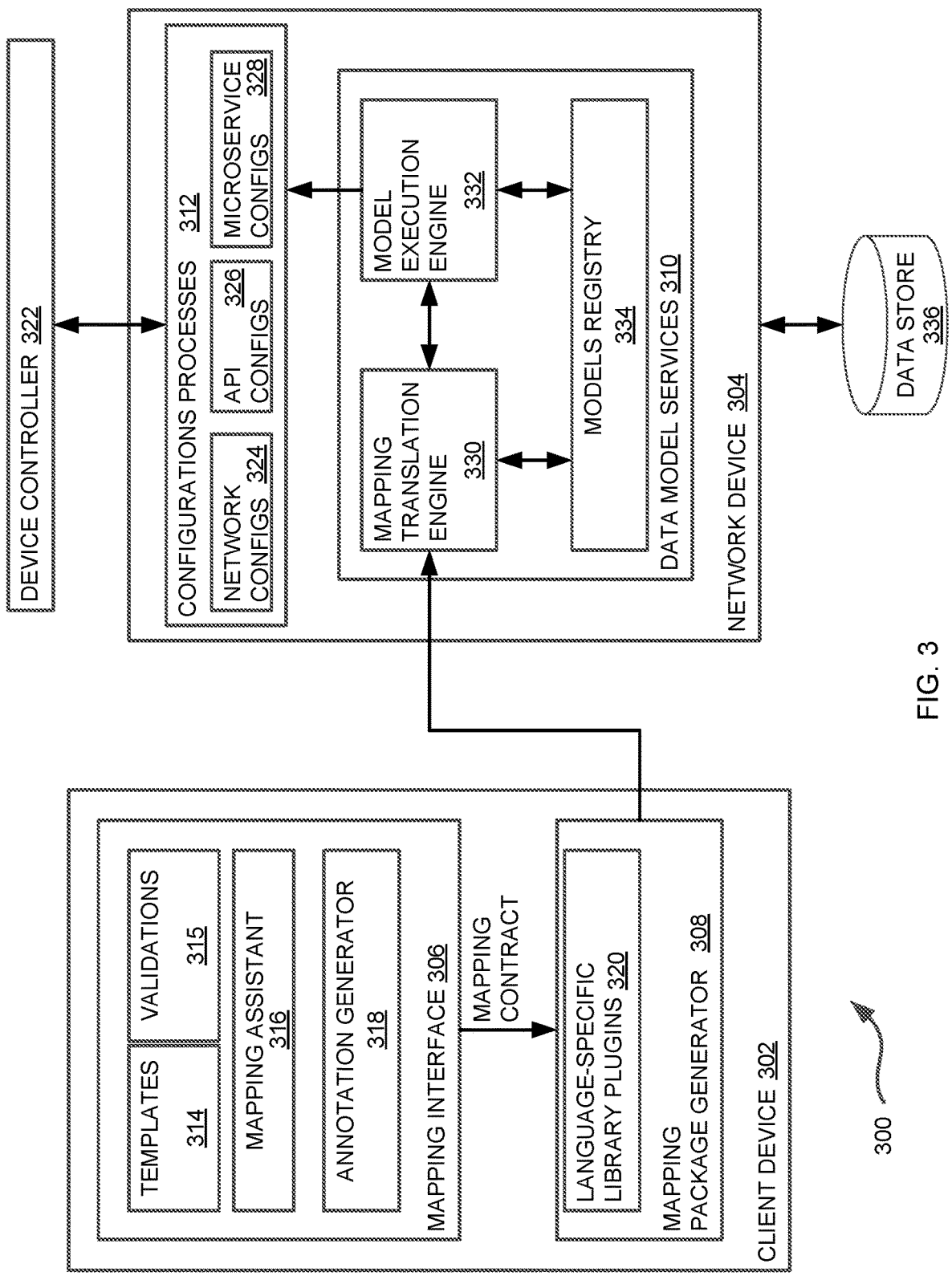
FIG. 3 illustrates a system for deploying a customized data model, according to various embodiments of the subject technology.

FIG. 3 depicts a system 300 for deploying a custom data model, extended data model, or data model overlay. In some examples, system 300 can perform some or all of the steps discussed above in reference to method 100 and method 200.

A user may generate a customized data model on a client device 302, which may be a desktop computer, laptop, mobile device, etc., through a mapping interface 306. Mapping interface 306 includes various components for generating a customized data model and may also include graphical components, command line components, and various other user experience aspects as will be understood by a person having ordinary skill in the art with the benefit of this disclosure.

Mapping interface 306 includes various templates 314 and validations 315. Templates 314 may include basic data models with specialized functionality based on use case and can be utilized by the user as a basis for further data model customization. Validations 315 may include various rules for validating the operational capabilities and/or compatibility of a customized data model. In some examples, validations 316 may be updated by one or more network devices 304 to include particular validation rules associated with particular network devices 304 and respective locally stored data models.

A mapping assistant 316 may guide the user in creating a customized data model. For example, where a user has added a particular feature to a customized data model, mapping assistant 316 can highlight issues in a resultant data model tree such as naming, inheritance, typing, and other issues. An annotation generator 318 receives a finalized customized data model and produces and annotated data model which serves as a mapping contract (e.g., as discussed in method 100 and method 200 above).

Mapping interface 306 may provide the mapping contract to a mapping package generator 308. In some examples, mapping interface 306 includes an export command or the like for finalizing the mapping contract and sending it to mapping package generator 308. Mapping package generator 308 includes language-specific library plugins 320 which, based on data model languages (e.g., C, Python, JavaScript, etc.), can include any needed plugins for generating a mapping package from the mapping contract. Mapping package generator 308 provides mapping packages to network device 304 either through a direct connection or via network connection.

In particular, network device 304 includes data model services 310 for processing and deploying received or stored data models and configuration processes 312 for interfacing with a device controller 322. Network device 304 also communicates with a data store 336, which may store, for example, native data models and/or open standard data models.

Data model services 310 includes a model registry 334 which manages stored data models (e.g., stored in data store 336) and may associate particular models with one or more different users, for example via namespace and the like. Data model services 310 further includes a mapping translation engine 330 and a model execution engine 332. Mapping translation engine 330 receives mapping packages from mapping package generator 308 and may implement appropriate bindings as well as integrate the customized data model as an overlay on locally stored data models retrieved by models registry 334. Model execution engine 332 may apply the customized data model to configuration processes 312 by interfacing with sub-processes within configurations processes 312. Configuration processes 312 includes network configurations 324, application programming interface (API) configurations 326 (e.g., REST API, etc.) and microservices configurations 328 (e.g., gRPC, etc.).

Once configured by model execution engine 332, and according to the customized data model, configuration processes 312 interfaces with device controller 322, for example, to manage network traffic according to the customized data model. For example, certain API calls may trigger particular microservices to generate values sent back as a response or to determine an appropriate forwarding destination and the like.

Figure 4:
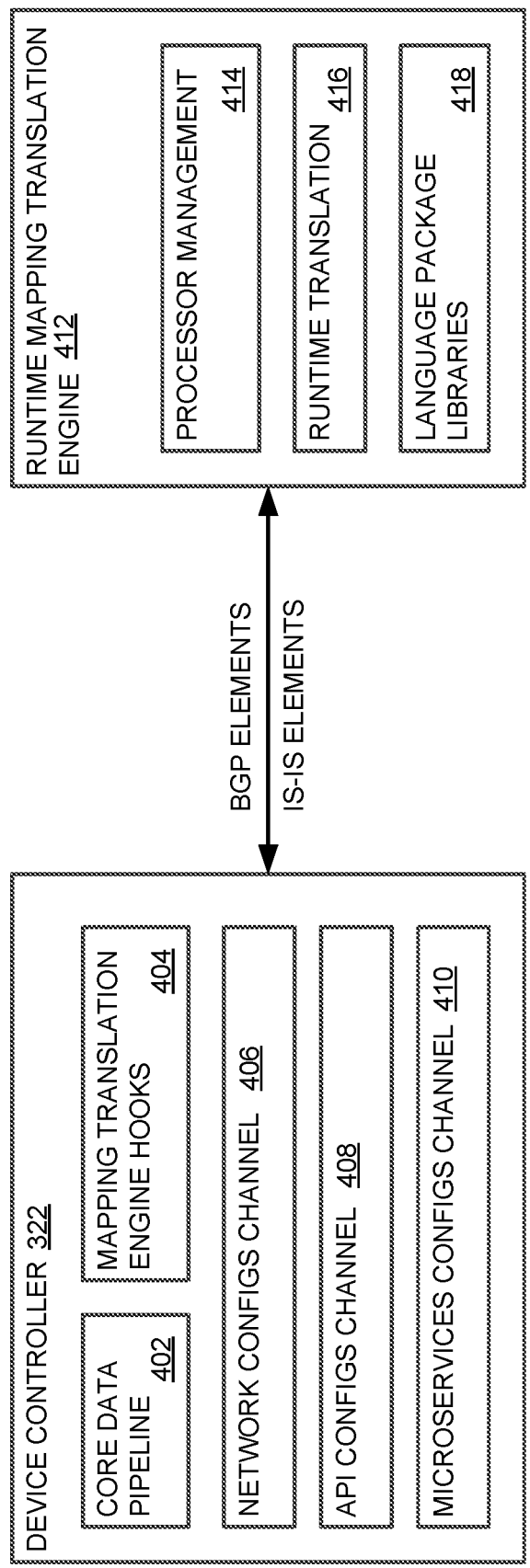
FIG. 4 illustrates a system for deploying a customized data model, according to various embodiments of the subject technology.

In some examples, device controller 322 may directly interface with a runtime mapping translation engine 412, as depicted in FIG. 4. In particular, device controller 322 can receive customized data model translations in real-time or near real-time. As a result, translations can be dynamic and so more responsive to changing information, for example, related to routing traffic across a network environment. Device controller 322 can provide border gateway protocol (BGP) and intermediate system-intermediate system (IS-IS)

protocol information to runtime mapping translation engine 412. In some examples, device controller 322 and runtime mapping translation engine 412 can be hosted by a shared device (e.g., a server) or may be hosted on different respective devices, either virtual or physical, and communicate via network communications, etc.

Device controller 322 can include a core data pipeline 402 and mapping translation engine hooks 404. Core data pipeline 402 may receive data, for example, over a network and, with mapping translation engine hooks 404, checks for any included data to be translated by runtime mapping translation engine 412. As a result, identified data to be translated can then be provided to runtime mapping translation engine 412 for application of a deployed customized data model.

Runtime mapping translation engine 412 includes a processor management process 414, a runtime translation process 416, and language package libraries 418. Processor management process 414 may provide and manage worker processes for performing operations related to the customized data model. Runtime translation process 416 provides translations for the customized data model. Language package libraries 418 may provide appropriate bindings and/or plugins based on a combination of device and customized data model factors such as data model language, supported languages by the device, and the like.

Device controller 322 may receive configuration information back from runtime mapping translation engine 412. The configuration information may provide particular settings, updates, etc. to be applied to network, API, and microservices protocols. Device controller 322 includes a network configurations channel 406 for receiving information related to network protocols and settings, an API configurations channel 408 for receiving information related to API protocols and settings, and a microservices configurations channel 410 for receiving information related to microservices protocols and settings. As a result, device controller 322 may apply a customized data model to network traffic in real-time via runtime mapping translation engine 412.

Figure 5:
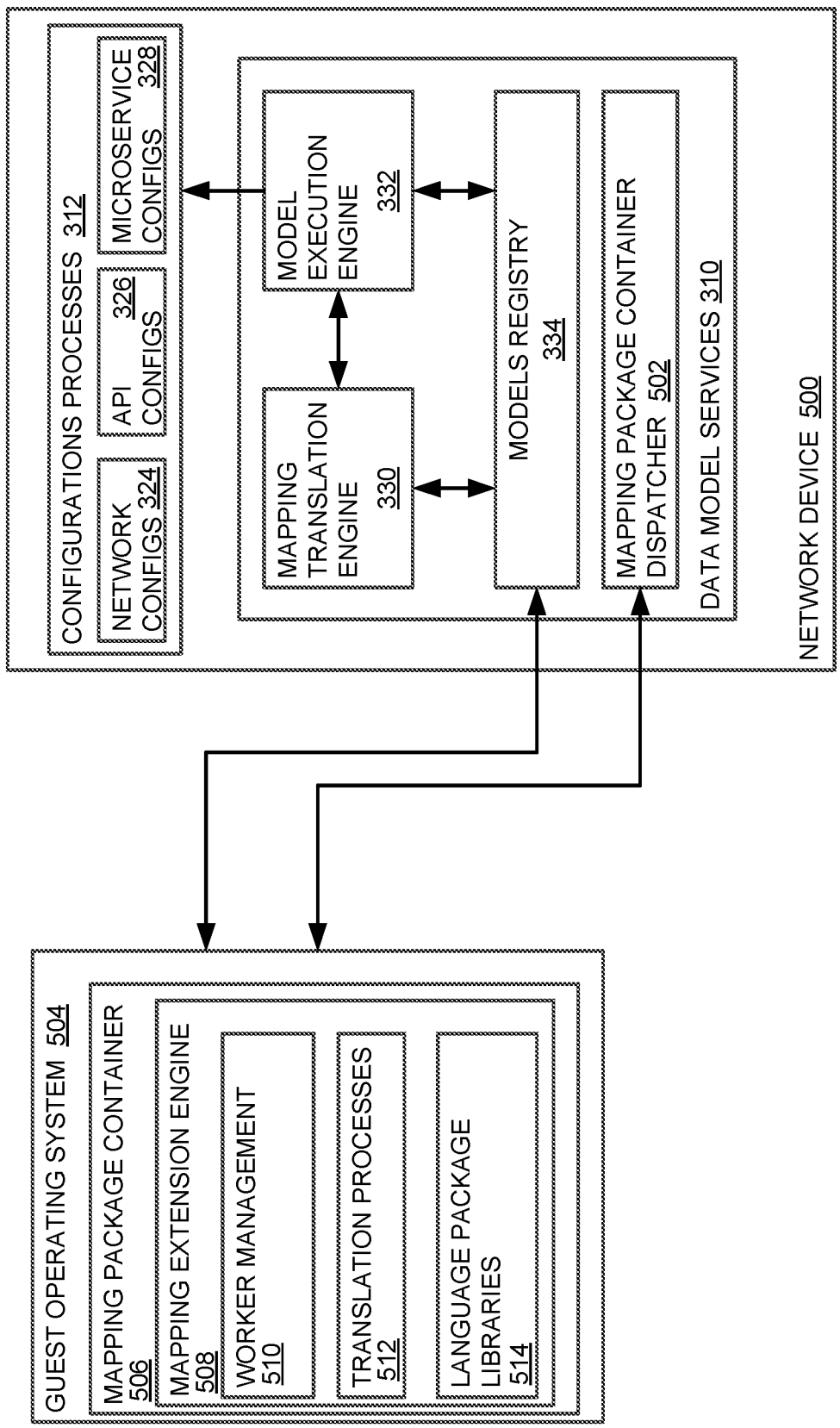
FIG. 5 illustrates a system for deploying a customized data model, according to various embodiments of the subject technology.

In some examples, a network device 500 may include or be associated with a dedicated operating environment for certain customized data model operations, as depicted in FIG. 5. For example, either on the same device or different devices, network device 304 may communicate with a guest operating system 504, which may be a linux kernel or the like configured for extending locally stored data models according to a customized data model.

Network device 500 is substantially similar to network device 304 discussed above and includes configuration processes 312, and data model services 310 such as mapping translation engine 330, model execution engine 332, and models registry 334. However, network device 500 further includes a mapping package container dispatcher 502 as part of data model services 310.

Mapping package container dispatcher 502 may communicate with guest operating system 504, for example, to deploy workers, containers for the customized data model, and perform various other operations according to the customized data model. Guest operating system 504 includes one or more mapping packing containers 506. Each mapping package container includes a mapping extension engine 508 for extending a locally stored data model according to the customized data model. Mapping extension engine 504 may retrieve local models or components of local models from models registry 334. Mapping extension engine 508 includes a worker management process 510, translation processes 512, and language package libraries 514.

For example, workers may be deployed by worker management process 510 according to BGP and/or access control list (ACL) extensions. BGP and ACL information may be translated from the customized data model by translation processes 512 and using plugins, etc., provided by language package libraries 514.

Figure 6:
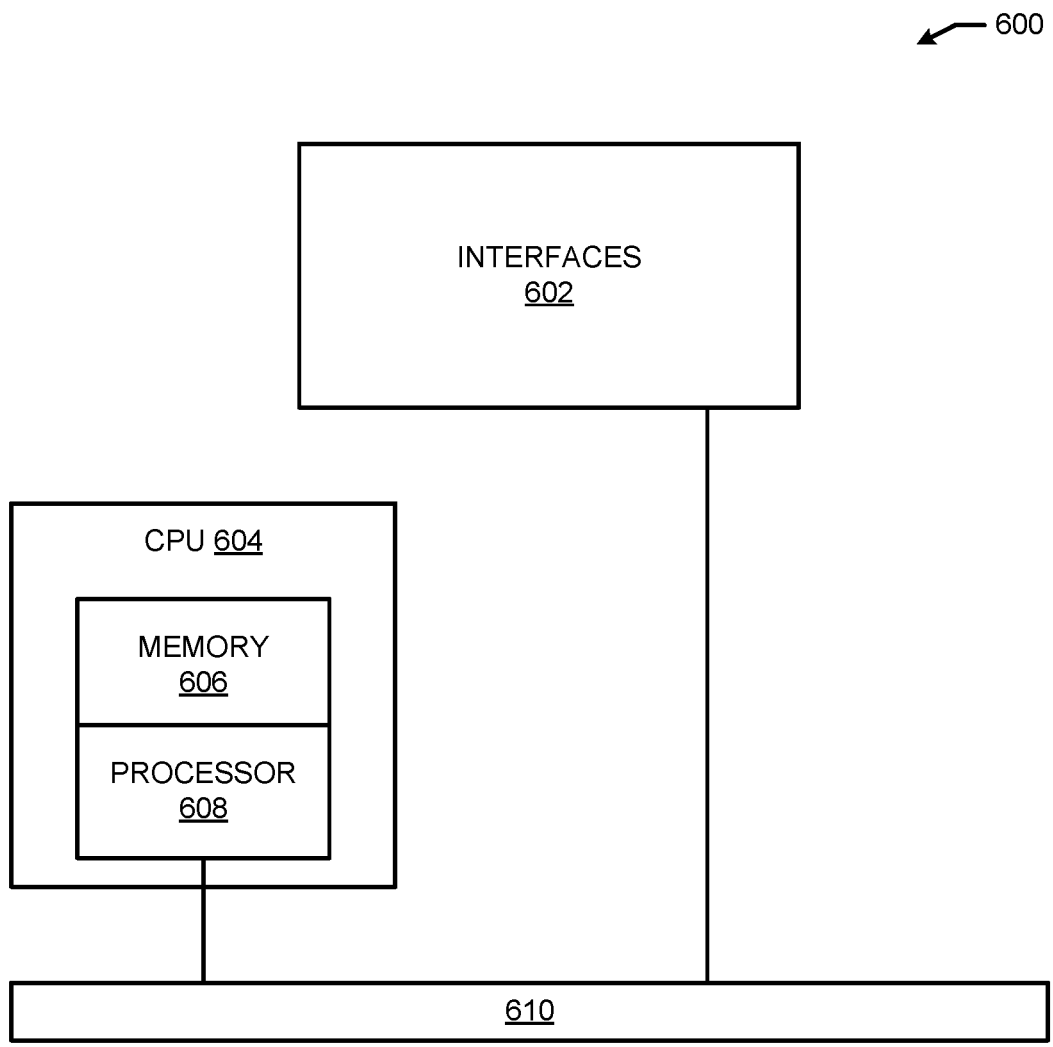
FIG. 6 illustrates an example network device, according to various embodiments of the subject technology.

Although the system shown in FIG. 6 is one specific network device of the present disclosure, it is by no means the only network device architecture on which the concepts herein can be implemented. For example, an architecture having a single processor 608 that handles communications as well as routing computations, etc., can be used. Further, other types of interfaces and media could also be used with the network device 600.

Regardless of the network device's configuration, it may employ a CPU 604 and one or more memories or memory modules (including memory 606) configured to store program instructions for the general-purpose network operations and mechanisms for functions described herein to be executed by processor 608. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing, switching, and/or other operations. The ASIC can communicate with other components in the network device 600 via the connection 610, to exchange data and signals and coordinate various types of operations by the network device 600, such as routing, switching, and/or data storage operations, for example.

Figure 7:
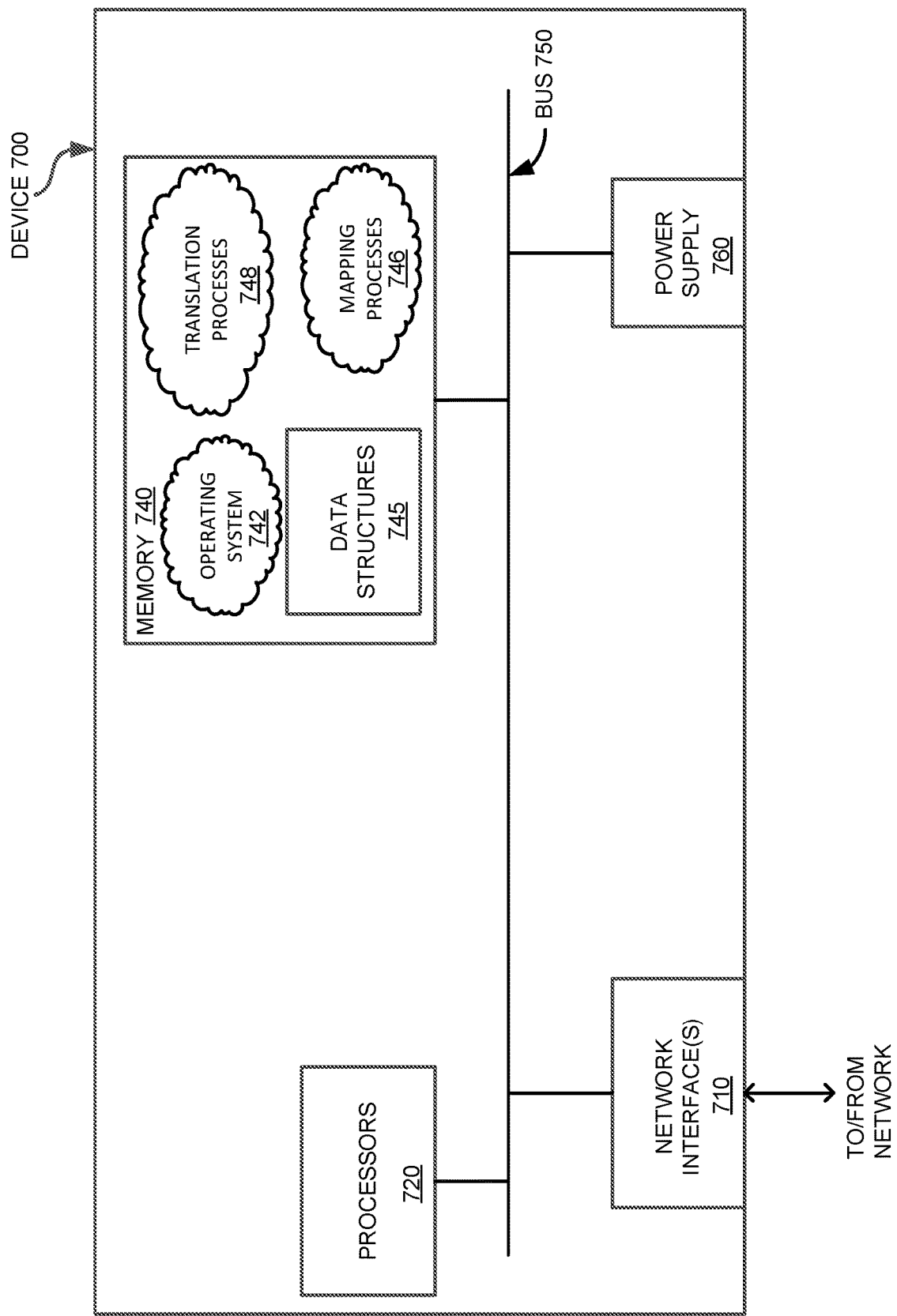
FIG. 7 illustrates an example computing device, according to various embodiments of the subject technology.

FIG. 7 is a schematic block diagram of an example computing device 700 that may be used with one or more embodiments described herein e.g., as any of the discussed above or to perform any of the methods discussed above, and particularly as specific devices as described further below. The device may comprise one or more network interfaces 710 (e.g., wired, wireless, etc.), at least one processor 720, and a memory 740 interconnected by a system bus 750, as well as a power supply 760 (e.g., battery, plug-in, etc.).

Network interface(s) 710 contain the mechanical, electrical, and signaling circuitry for communicating data over links coupled to a network, e.g., providing a data connection between device 700 and the data network, such as the Internet. The network interfaces may be configured to transmit and/or receive data using a variety of different communication protocols. For example, interfaces 710 may include wired transceivers, wireless transceivers, cellular transceivers, or the like, each to allow device 700 to communicate information to and from a remote computing device or server over an appropriate network. The same network interfaces 710 also allow communities of multiple devices 700 to interconnect among themselves, either peer-to-peer, or up and down a hierarchy. Note, further, that the nodes may have two different types of network connections 710, e.g., wireless and wired/physical connections, and that the view herein is merely for illustration. Also, while the network interface 710 is shown separately from power supply 760, for devices using powerline communication (PLC) or Power over Ethernet (PoE), the network interface 710 may communicate through the power supply 760, or may be an integral component of the power supply.

Memory 740 comprises a plurality of storage locations that are addressable by the processor 720 and the network interfaces 710 for storing software programs and data structures associated with the embodiments described herein. The processor 720 may comprise hardware elements or hardware logic adapted to execute the software programs and manipulate the data structures 745. An operating system 742, portions of which are typically resident in memory 740 and executed by the processor, functionally organizes the device by, among other things, invoking operations in support of software processes and/or services executing on the device. These software processes and/or services may comprise one or more mapping processes 746 which, on certain devices, may be used by an illustrative translation process 748, as described herein. Notably, mapping processes 746 may be stored and/or retrieved for storage by processor(s) 720 via, for example, network interface(s) 710 or other processes according to the configuration of device 700.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Statements follow describing various aspects of the subject technology:

Statement 1: A method for dynamically executing a customized data model includes receiving definitions for a data model, the definitions related to one or more changes in functionality of the data model, generating a mapping package including one or more mappings for the data model based on the received definitions, deploying, with a mapping translation engine, the mapping package to a network device, and controlling the network device according to the deployed mapping package.

Statement 2: A method according to Statement 1 further includes configuring a device controller according to the deployed mapping package, wherein the device controller controls the network device.

Statement 3: A method according to Statement 1 or Statement 2 further includes providing network information to a runtime mapping translation engine, the runtime translation engine including one or more of a processor management process, a translation process, or language package libraries, and configuring the device controller by the runtime mapping translation engine in response to the provided network information.

Statement 4: A method according to any of the preceding Statements further includes deploying a mapping package container to a guest operating system based on the mapping package, the mapping package container including a mapping extension engine, and executing a portion of the mapping package by the mapping package container.

Statement 5: A method according to any of the preceding Statements further includes routing network traffic by the network device.

Statement 6: A method according to any of the preceding Statements further includes verifying feature coverage by the network device of the received definitions.

Statement 7: A method according to any of the preceding Statements, wherein the definitions reference one or more locally stored data models, the locally stored data models are accessible by the network device, and each locally stored data model includes a respective version, further includes verifying the referenced one or more locally stored data models based on the respective version.

Statement 8: A system for dynamically executing a customized data model includes one or more processors, and a memory storing instructions for the one or more processors to receive definitions for a data model, the definitions related to one or more changes in functionality of the data model, generate a mapping package including one or more mappings for the data model based on the received definitions, deploy, with a mapping translation engine, the mapping package to a network device, and control the network device according to the deployed mapping package.

Statement 9: A non-transitory computer readable medium includes instructions that, when executed by one or more processors configured for dynamically executing a customized data model, cause the one or more processors to receive definitions for a data model, the definitions related to one or more changes in functionality of the data model, generate a mapping package including one or more mappings for the data model based on the received definitions, deploy, with a mapping translation engine, the mapping package to a network device, and control the network device according to the deployed mapping package.

Statement 10: A system comprising one or more processors and a memory storing instructions which, when executed by the one or more processors, cause the system to perform a method according to any of Statements 1 through 7.

What is claimed is:

1. A method for dynamically executing a customized data model, the method comprising:
   receiving definitions for a data model, the definitions related to one or more changes in functionality of the data model;
   generating a mapping package comprising one or more mappings for the data model based on the received definitions;

deploying, with a mapping translation engine, the mapping package to a network device; and controlling the network device according to the deployed mapping package.

2. The method of claim 1, further comprising configuring a device controller according to the deployed mapping package, wherein the device controller controls the network device.

3. The method of claim 2, further comprising:

providing network information to a runtime mapping translation engine, the runtime translation engine comprising one or more of a processor management process, a translation process, or language package libraries; and configuring the device controller by the runtime mapping translation engine in response to the provided network information.

4. The method of claim 1, further comprising:

deploying a mapping package container to a guest operating system based on the mapping package, the mapping package container comprising a mapping extension engine; and executing a portion of the mapping package by the mapping package container.

5. The method of claim 1, further comprising routing network traffic by the network device.

6. The method of claim 1, further comprising verifying feature coverage by the network device of the received definitions.

7. The method of claim 1, wherein the definitions reference one or more locally stored data models, the one or more locally stored data models accessible by the network device and each comprising a respective version, and the method further comprising verifying the referenced one or more locally stored data models based on the respective version.

8. A system for dynamically executing a customized data model, the system comprising:

one or more processors; and a memory comprising instructions for the one or more processors to:

receive definitions for a data model, the definitions related to one or more changes in functionality of the data model;

generate a mapping package comprising one or more mappings for the data model based on the received definitions;

deploy, with a mapping translation engine, the mapping package to a network device; and control the network device according to the deployed mapping package.

9. The system of claim 8, wherein the memory further comprises instructions to configure a device controller according to the deployed mapping package, wherein the device controller controls the network device.

10. The system of claim 9, wherein the memory further comprises instructions to:

provide network information to a runtime mapping translation engine, the runtime translation engine comprising one or more of a processor management process, a translation process, or language package libraries; and configure the device controller by the runtime mapping translation engine in response to the provided network information.

11. The system of claim 8, wherein the memory further comprises instructions to:

deploy a mapping package container to a guest operating system based on the mapping package, the mapping package container comprising a mapping extension engine; and execute a portion of the mapping package by the mapping package container.

12. The system of claim 8, wherein the memory further comprises instructions to route network traffic by the network device.

13. The system of claim 8, wherein the memory further comprises instructions to verify feature coverage by the network device of the received definitions.

14. The system of claim 8, wherein the definitions reference one or more locally stored data models, the one or more locally stored data models accessible by the network device and each comprising a respective version, and wherein the memory further comprises instructions to verify the referenced one or more locally stored data models based on the respective version.

15. A non-transitory computer readable medium comprising instructions that, when executed by one or more processors, cause the one or more processors to:

receive definitions for a data model, the definitions related to one or more changes in functionality of the data model;

generate a mapping package comprising one or more mappings for the data model based on the received definitions;

deploy, with a mapping translation engine, the mapping package to a network device; and control the network device according to the deployed mapping package.

16. The non-transitory computer readable medium of claim 15, further comprising instructions to:

configure a device controller according to the deployed mapping package, wherein the device controller controls the network device;

provide network information to a runtime mapping translation engine, the runtime translation engine comprising one or more of a processor management process, a translation process, or language package libraries; and configure the device controller by the runtime mapping translation engine in response to the provided network information.

17. The non-transitory computer readable medium of claim 15, further comprising instructions to:

deploy a mapping package container to a guest operating system based on the mapping package, the mapping package container comprising a mapping extension engine; and execute a portion of the mapping package by the mapping package container.

18. The non-transitory computer readable medium of claim 15, further comprising instructions to route network traffic by the network device.

19. The non-transitory computer readable medium of claim 15, further comprising instructions to verify feature coverage by the network device of the received definitions.

20. The non-transitory computer readable medium of claim 15, wherein the definitions reference one or more locally stored data models, the one or more locally stored data models accessible by the network device and each comprising a respective version, and further comprising instructions to verify the referenced one or more locally stored data models based on the respective version.

* * * * *